(12) United States Patent
Hanasaki et al.

(10) Patent No.: US 11,101,463 B2
(45) Date of Patent: Aug. 24, 2021

(54) COPOLYMER FOR BINDERS FOR NONAQUEOUS BATTERY ELECTRODES, SLURRY FOR NONAQUEOUS BATTERY ELECTRODES, NONAQUEOUS BATTERY ELECTRODE, AND NONAQUEOUS BATTERY

(71) Applicant: SHOWA DENKO K.K., Tokyo (JP)

(72) Inventors: Mitsuru Hanasaki, Tokyo (JP); Yasuhiro Nakagawa, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 218 days.

(21) Appl. No.: 16/081,080

(22) PCT Filed: Feb. 16, 2017

(86) PCT No.: PCT/JP2017/005682
§ 371 (c)(1),
(2) Date: Aug. 30, 2018

(87) PCT Pub. No.: WO2017/150200
PCT Pub. Date: Sep. 8, 2017

(65) Prior Publication Data
US 2019/0058195 A1    Feb. 21, 2019

(30) Foreign Application Priority Data
Mar. 4, 2016    (JP)    ................ JP2016-042855

(51) Int. Cl.
| | | |
|---|---|---|
| *H01M 4/13* | (2010.01) | |
| *H01M 4/62* | (2006.01) | |
| *C08F 220/06* | (2006.01) | |
| *C08F 226/02* | (2006.01) | |
| *H01M 4/04* | (2006.01) | |
| *H01M 4/139* | (2010.01) | |
| *H01M 4/133* | (2010.01) | |
| *H01M 4/587* | (2010.01) | |
| *H01M 10/0525* | (2010.01) | |
| *H01M 4/505* | (2010.01) | |
| *H01M 4/525* | (2010.01) | |
| *H01M 4/583* | (2010.01) | |
| *H01M 4/02* | (2006.01) | |

(52) U.S. Cl.
CPC ........... *H01M 4/622* (2013.01); *C08F 220/06* (2013.01); *C08F 226/02* (2013.01); *H01M 4/0404* (2013.01); *H01M 4/13* (2013.01); *H01M 4/133* (2013.01); *H01M 4/139* (2013.01); *H01M 4/587* (2013.01); *H01M 4/62* (2013.01); *H01M 10/0525* (2013.01); *C08F 2800/20* (2013.01); *H01M 4/505* (2013.01); *H01M 4/525* (2013.01); *H01M 4/583* (2013.01); *H01M 2004/027* (2013.01); *H01M 2300/0017* (2013.01)

(58) Field of Classification Search
CPC ...... H01M 4/622; H01M 4/0404; H01M 4/13; H01M 4/133; H01M 4/139; H01M 4/587; H01M 4/62; H01M 4/505; H01M 4/525; H01M 4/583; H01M 10/0525; H01M 10/052; H01M 2004/027; H01M 2300/0017; C08F 220/06; C08F 226/02
See application file for complete search history.

(56) References Cited

U.S. PATENT DOCUMENTS

| | | | | |
|---|---|---|---|---|
| 5,254,338 A | * | 10/1993 | Sakai ............... | A61K 9/0014 424/443 |
| 6,475,671 B1 | * | 11/2002 | Matsuura ........... | H01M 4/242 429/217 |
| 2014/0287308 A1 | * | 9/2014 | Okada ............... | H01M 4/622 429/217 |

FOREIGN PATENT DOCUMENTS

| | | |
|---|---|---|
| CN | 103339757 A | 10/2013 |
| CN | 104081567 A | 10/2014 |
| JP | 08-250123 A | 9/1996 |
| JP | 10-298386 A | 11/1998 |
| JP | 2014-235798 A | 12/2004 |
| JP | 2005-336166 A | 12/2005 |

(Continued)

OTHER PUBLICATIONS

Office Action of Taiwanese Application No. 106106212 dated Nov. 24, 2017.

(Continued)

*Primary Examiner* — Raymond Alejandro
(74) *Attorney, Agent, or Firm* — Sughrue Mion, PLLC

(57) ABSTRACT

A copolymer for binders, which is capable of reducing the internal resistance of a battery, while ensuring sufficient binding properties between active materials and between an active material and a collector in a nonaqueous battery electrode; a composition for binders; a slurry for nonaqueous battery electrodes; a nonaqueous battery electrode; and a nonaqueous battery. This copolymer for binders is a copolymer for binders (P) of a monomer mixture (M) that contains at least a monomer (A) represented by general formula (1) and a (meth)acrylate salt monomer (B); and an amount of structure derived from the monomer (A) based on the copolymer for binders (P) is set to 0.5 to 20.0% by mass. (In the formula, each of $R^1$ and $R^2$ independently represents a hydrogen atom or an alkyl group having 1 to 5 carbon atoms.)

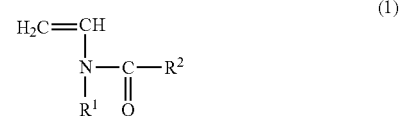

(1)

11 Claims, No Drawings

(56) References Cited

FOREIGN PATENT DOCUMENTS

| JP | 2006-321792 A | 11/2006 |
| JP | 2014-120411 A | 6/2014 |
| WO | 00/60168 A1 | 10/2000 |

OTHER PUBLICATIONS

International Search Report of PCT/JP2017/005682 dated Mar. 21, 2017 [PCT/ISA/210].
Erich E. Kathmann et. al., "Water-Soluble Copolymers. 67. Polyelectrolytes of N-Vinylformamide with Sodium 3-Acrylamido-3-methylbutanoate, Sodium 2-Acrylamido-2-methylpropanesulfonate, and Sodium Acrylate: Synthesis and Characterization" Macromolecules, American Chemical Society, Jul. 29, 1996, Washington, DC, United States, vol. 29, No. 16, pp. 5268-5272 (5 pages total).
Communication dated Oct. 17, 2019, from the European Patent Office in European Application No. 17759671.5.
Office Action dated Jul. 21, 2020 from the China National Intellectual Property Administration in Application No. 201780006842.X.

* cited by examiner

COPOLYMER FOR BINDERS FOR NONAQUEOUS BATTERY ELECTRODES, SLURRY FOR NONAQUEOUS BATTERY ELECTRODES, NONAQUEOUS BATTERY ELECTRODE, AND NONAQUEOUS BATTERY

CROSS REFERENCE TO RELATED APPLICATIONS

This application is a National Stage of International Application No. PCT/JP2017/005682, filed Feb. 16, 2017. Priority is claimed on Japanese Patent Application No. 2016-042855 filed in Japan on Mar. 4, 2016, the contents of which are hereby incorporated by reference.

TECHNICAL FIELD

The present invention relates to a copolymer for binders for nonaqueous battery electrodes, a slurry for nonaqueous battery electrodes, a nonaqueous battery electrode formed by using the slurry for nonaqueous battery electrodes, and a nonaqueous battery having the nonaqueous battery electrode.

BACKGROUND ART

Nonaqueous batteries using nonaqueous electrolytes are superior to aqueous batteries in view of their high voltage, small size, and light weight. For this reason, nonaqueous batteries are widely used as power sources for laptop computers, mobile phones, power tools, and electronic and communication equipment. In recent years, nonaqueous batteries have also been used for electric vehicles and hybrid vehicles from the viewpoint of application of environmentally friendly vehicles, but high output, high capacity, long life and the like are strongly required for nonaqueous batteries. A typical example of a nonaqueous battery is a lithium ion secondary battery.

A nonaqueous battery is provided with a positive electrode using a metal oxide or the like as an active material, a negative electrode using a carbon material such as graphite as an active material, and a nonaqueous electrolytic solvent mainly including a carbonate or a flame-retardant ionic liquid. A nonaqueous battery is a secondary battery in which charging and discharging of the battery are performed by ions moving between a positive electrode and a negative electrode. Specifically, the positive electrode is obtained by applying a slurry composed of a metal oxide and a binder to a surface of a positive electrode current collector such as an aluminum foil, drying it, and then cutting it into a suitable size. The negative electrode is obtained by applying a slurry composed of a carbon material and a binder to a surface of a negative electrode current collector such as a copper foil, drying it, and then cutting it into a suitable size. The binder plays a role of bonding the active materials to each other and bonding the active material and the current collector in the positive electrode or the negative electrode to prevent peeling of the active material from the current collector.

As a binder, a polyvinylidene fluoride (PVDF)-based binder using an organic solvent of N-methyl-2-pyrrolidone (NMP) as a solvent is well known (Patent Document 1). However, this binder has low binding properties between the active materials and between the active material and the current collector, and requires a large amount of the binder for practical use. Therefore, there is a disadvantage that the capacity of the nonaqueous battery decreases. In addition, since an expensive organic solvent of NMP is used for the binder, there is also a problem in the price of the final product and maintenance of the working environment during preparation of a slurry or a current collector.

As a method for solving these problems, development of a water-dispersible binder has been promoted conventionally, for example, a water dispersion of a styrene-butadiene rubber (SBR) type in which carboxymethyl cellulose (CMC) is used as a thickener is disclosed (Patent Document 2). Since the SBR type dispersion is an aqueous dispersion, it is inexpensive and it is advantageous from the viewpoint of maintenance of working environment. In addition, the binding properties between the active materials and between the active material and the current collector are relatively high. Therefore, it is possible to manufacture the electrode by using a smaller amount of binder than of the PVDF-based binder, and there is an advantage that the nonaqueous battery may have higher output and higher capacity. From these facts, SBR type dispersions are widely used as binders for nonaqueous battery electrodes.

However, it is necessary to use carboxymethyl cellulose as a thickener in combination with the SBR type binder. As a result, the slurry preparation process becomes complicated. Furthermore, even using this binder, the binding properties between the active materials and between the active material and the current collector are insufficient. As a result, there is a problem that the active material is partly peeled off in a step of cutting the current collector when the electrode is produced with a smaller amount of the binder.

Patent Document 3 discloses an adhesive composition for patches, which contains a sodium acrylate-N-vinylacetamide copolymer (copolymerization ratio by mass:sodium acrylate/N-vinylacetamide=40/60). In addition, Patent Document 4 discloses a composition for a hydrous gel body containing sodium acrylate-N-vinylacetamide (molar ratio: 55/45) copolymer. These sodium acrylate-N-vinylacetamide copolymers contain large amounts of components derived from N-vinylacetamide. When such a polymer is mixed with a negative electrode active material (hardly graphitized carbon) and water to form a slurry for nonaqueous battery electrodes, there are aggregates in the slurry, and it is impossible to reduce the internal resistance of a battery (as shown in below Comparative Examples 3 and 4).

[Patent Document 1] Japanese Unexamined Patent Application Publication No. H10-298386

[Patent Document 2] Japanese Unexamined Patent Application Publication No. H08-250123

[Patent Document 3] Japanese Unexamined Patent Application Publication No. 2005-336166

[Patent Document 4] Japanese Unexamined Patent Application Publication No. 2006-321792

SUMMARY OF THE INVENTION

In order to solve the above problems, the present invention aims to provide a copolymer for binders for nonaqueous battery electrodes capable of reducing internal resistance of a battery while ensuring sufficient binding properties between active materials and between an active material and a current collector in a nonaqueous battery electrode, a slurry for nonaqueous battery electrodes, a nonaqueous battery electrode, and a nonaqueous battery.

In order to solve the above problem, the present invention is as described below in [1] to [11].

[1] A copolymer for binders for nonaqueous battery electrodes, wherein the copolymer is a copolymer for binders (P) of a monomer mixture (M) that contains at least a monomer (A) represented by general formula (1) and a (meth)acrylate salt monomer (B); and an amount of structure derived from the monomer (A) based on the copolymer for binders (P) is set to 0.5 to 20.0% by mass,

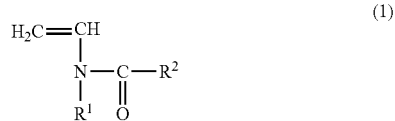

wherein $R^1$ and $R^2$ each independently represent a hydrogen atom or an alkyl group having 1 to 5 carbon atoms.

[2] The copolymer for binders for nonaqueous battery electrodes according to [1], wherein the monomer mixture (M) further comprises an ethylenically unsaturated monomer (C) having a polar functional group.

[3] The copolymer for binders for nonaqueous battery electrodes according to [1] or [2], wherein the monomer (A) is N-vinylformamide or N-vinylacetamide.

[4] The copolymer for binders for nonaqueous battery electrodes according to any one of [1] to [3], wherein the weight average molecular weight of the copolymer for binders (P) is in the range of 1,000,000 to 10,000,000.

[5] The copolymer for binders for nonaqueous battery electrodes according to any one of [2] to [4], wherein an amount of structure derived from the monomer (B) is 20.0 to 99.0% by mass based on the copolymer for binders (P), and an amount of structure derived from the monomer (C) is 0.5 to 60.0% by mass based on the copolymer for binders (P).

[6] A slurry for nonaqueous battery electrodes comprising
the copolymer for binders for nonaqueous battery electrodes according to any one of [1] to [5], and
an electrode active material.

[7] The slurry for nonaqueous battery electrodes according to [6], wherein the electrode active material is a negative electrode active material.

[8] The slurry for nonaqueous battery electrodes according to [6] or [7], wherein a content of the nonaqueous battery electrode copolymer for binders (P) is 0.1 to 5 parts by mass with respect to 100 parts by mass of the electrode active material.

[9] A nonaqueous battery electrode comprising
a current collector, and
an electrode active material layer formed on the current collector,
wherein the electrode active material layer comprises the copolymer for binders for nonaqueous battery electrodes according to any one of [1] to [5].

[10] A nonaqueous battery electrode according to [9], wherein the electrode active material is a negative electrode active material.

[11] A nonaqueous battery comprising the nonaqueous battery electrode according to [9] or [10].

According to the present invention, it is possible to provide a copolymer for binders for nonaqueous battery electrodes capable of reducing internal resistance of a battery while ensuring sufficient binding properties between active materials and between the active material and the current collector in the nonaqueous battery electrode, a slurry for nonaqueous battery electrodes, a nonaqueous battery electrode, and a nonaqueous battery.

DETAILED DESCRIPTION OF THE INVENTION

<1. Copolymer for Binders for Nonaqueous Battery Electrodes (P)>

A copolymer for binders for nonaqueous battery electrodes (P) of the present embodiment (hereinafter, sometimes abbreviated as "copolymer for binders (P)" or "copolymer (P)") is used in an electrode of a nonaqueous battery described below for bonding electrode active materials to each other and bonding an electrode active material and a current collector. The copolymer for binders for nonaqueous battery electrodes (P) according to this embodiment is a copolymer of a monomer mixture (M) which contains at least a monomer (A) represented by the following general formula (1), and a (meth)acrylate salt monomer (B). An amount of structure derived from the monomer (A) is from 0.5 to 20.0% by mass based on the copolymer (P).

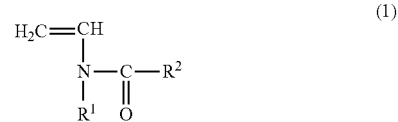

(In the formula, $R^1$ and $R^2$ each independently represent a hydrogen atom or an alkyl group having 1 to 5 carbon atoms.)

The monomer mixture (M) may further contain an ethylenic unsaturated monomer (C) having a polar functional group.

When synthesizing the copolymer (P), it is preferable to carry out polymerization in an aqueous medium. Polymerization is preferably carried out in an aqueous medium using a radical polymerization initiator. Examples of the polymerization method include a method in which all the components used for polymerization are fed collectively and polymerized, and a method in which polymerization is carried out while continuously feeding each component used for polymerization. Polymerization is usually carried out at a temperature of 30 to 90° C. Specific examples of the polymerization method of the copolymer (P) will be described in detail in the examples below.

The weight average molecular weight of the copolymer (P) is from 1,000,000 to 10,000,000, preferably from 3,000,000 to 10,000,000, and more preferably from 5,000,000 to 10,000,000. Here, the weight average molecular weight is a value in terms of pullulan, and an example of a specific measurement method will be described in Examples later.

<1-1. Monomer (A)>

In the monomer (A), in the general formula (1), $R^1$ and $R^2$ are each independently a hydrogen atom or an alkyl group having 1 to 5 carbon atoms. $R^1$ and $R^2$ are each independently preferably a hydrogen atom or an alkyl group having 1 to 3 carbon atoms, and it is more preferable for $R^1$ and $R^2$ to each independently be a hydrogen atom or a methyl group.

Preferable specific examples of the combination of $R^1$ and $R^2$ include $R^1$:H, $R^2$:H (that is, the monomer (A) is N-vinylformamide), $R^1$:H, and $R^2$:CH$_3$ (that is, the monomer (A) is N-vinylacetamide).

Further, an amount of structure derived from the monomer (A) is from 0.5 to 20.0% by mass based on the copolymer (P). It is preferably 0.5 to 15.0% by mass, and more preferably 0.5 to 10.0% by mass.

The amount of the monomer (A) contained in the monomer mixture (M) is 0.5 to 20.0% by mass based on the total amount of the monomer mixture (M). It is preferably 0.5 to 15.0% by mass, and more preferably 0.5 to 10.0% by mass.

<1-2. (Meth)Acrylate Salt Monomer (B)>

As the (meth)acrylate salt monomer (B), sodium (meth)acrylate, potassium (meth)acrylate and ammonium (meth)acrylate are preferred. Among these, sodium (meth)acrylate and ammonium (meth)acrylate are more preferable, and sodium acrylate is most preferable. The (meth)acrylate salt monomer (B) is obtained, for example, by neutralizing (meth)acrylic acid with hydroxide, ammonia water, etc. Among them, from the viewpoint of availability, it is preferable to neutralize the acid by using sodium hydroxide.

An amount of the monomer (B) is 20.0 to 99.0% by mass based on the monomer mixture (M). It is preferably 25.0 to 99.0% by mass, and more preferably 30.0 to 99.0% by mass.

<1-3. Ethylenically Unsaturated Monomer (C)>

The monomer mixture (M) of the present embodiment may further contain an ethylenically unsaturated monomer (C) having a polar functional group.

The ethylenically unsaturated monomer (C) is preferably a compound having at least one polymerizable ethylenically unsaturated group and having a polar group such as a carboxyl group, a hydroxyl group, an amide group, a cyano group or the like. When the ethylenically unsaturated monomer (C) contains an amide group, the monomer (A) represented by the general formula (1) is excluded from the ethylenically unsaturated monomer (C). Examples of the ethylenic unsaturated monomer having a carboxyl group include acrylic acid, methacrylic acid, itaconic acid and the like. Examples of the ethylenic unsaturated monomer having a hydroxy group include (meth)acrylic acid-2-hydroxyethyl and the like. Examples of the ethylenic unsaturated monomer having an amide group include acrylamide, N-alkyl (meth)acrylamide, N,N-dialkyl (meth)acrylamide, N-hydroxyalkyl(meth) acrylamide having an alkyl group having 1 to 3 carbon atoms, diacetone (meth)acrylamide, dimethylaminoalkyl (meth)acrylamide in which the alkyl group in the moiety excluding the dimethylamino group has 1 to 5 carbon atoms, and (meth)acrylamide-2-methylpropanesulfonic acid. Examples of the ethylenically unsaturated monomer having a cyano group include (meth)acrylonitrile and the like. Among these, acrylic acid, itaconic acid, 2-hydroxyethyl acrylate and acrylamide are preferable from the viewpoint of availability.

The amount of the ethylenically unsaturated monomer (C) is 0.5 to 60.0% by mass, preferably 0.5 to 55.0% by mass based on the monomer mixture (M), and more preferably 0.5 to 50.0% by mass.

<1-4. Polymerization Initiator>

Examples of the radical polymerization initiator used in the polymerization include ammonium persulfate, potassium persulfate, hydrogen peroxide, t-butyl hydroperoxide, azo compounds, and the like, but are not limited thereto. When polymerization is carried out in water, it is preferable to use a water-soluble polymerization initiator. If necessary, redox polymerization may be carried out by using a radical polymerization initiator in combination with a reducing agent such as sodium bisulfite, Rongalite, ascorbic acid or the like at the time of polymerization.

<1-5. Aqueous Medium Used for Polymerization>

In the present embodiment, water is used as the aqueous medium for polymerization, however, a solution obtained by adding a hydrophilic solvent to water may be used as an aqueous medium, as long as it does not impair the polymerization stability of the resultant copolymer. Examples of the hydrophilic solvent to be added to water include methanol, ethanol, N-methylpyrrolidone and the like.

<2. Slurry for Nonaqueous Battery Electrode>

The slurry for nonaqueous battery electrodes of the present embodiment (hereinafter sometimes simply referred to as a "slurry") is obtained by dissolving and dispersing a copolymer for binders (P) and an electrode active material in an aqueous medium. The slurry of the present embodiment may contain a thickener, which is an optional component as required, but it is preferable not to include a thickener in order to simplify the slurry preparation step. The method of preparing the slurry is not particularly limited, but for example, there is a method of mixing required components using a mixing device such as a stirring type, a rotary type, a shaking type or the like.

<2-1. Amount of Copolymer for Binders for Nonaqueous Battery Electrodes>

An amount of the copolymer for binders (P) contained in the slurry is preferably 0.1 to 5.0% by mass based on the total mass of the electrode active material and the copolymer for binders (P). Within this range, the amount is sufficient to ensure the binding property between the electrode active materials and between the electrode active materials and the current collector, and the internal resistance of a battery is also low. The amount of the copolymer for binders (P) is more preferably 0.3 to 4.5% by mass, and most preferably 0.5 to 3.5% by mass.

<2-2. Electrode Active Material>

The electrode active material may be any material capable of doping/dedoping lithium or the like. When the slurry is for forming a negative electrode, examples of the electrode active material include conductive polymers such as polyacetylene and polypyrrole; cokes such as coke, petroleum coke, pitch coke and coal coke; carbon blacks such as polymer charcoal, carbon fiber and acetylene black; graphites such as artificial graphite and natural graphite; a lithium titanate; silicon and the like. Among these active materials, carbon blacks, graphite, natural graphite, lithium titanate, silicon, or the like is preferably used from the viewpoint of high energy density per volume. Among them, when carbon materials including cokes such as coke, petroleum coke, pitch coke and coal coke; carbon blacks such as polymer coal, carbon fiber and acetylene black; and graphites such as artificial graphite and natural graphite are used, the effect of improving the binding property by the copolymer for binders (P) of the embodiment is remarkable.

When the slurry is for forming a positive electrode, examples of the electrode active material include lithium complex oxides containing nickel such as lithium cobalt oxides (LiCoO$_2$), Ni—Co—Mn lithium complex oxides, Ni—Mn—Al lithium complex oxides, Ni—Co—Al lithium complex oxides; spinel type lithium manganates (LiMn$_2$O$_4$); olivine type lithium iron phosphates; chalcogen compounds such as TiS$_2$, MnO$_2$, MoO$_3$, V$_2$O$_5$, and the like; or a combination of two or more of these. Other oxides of alkali metals may also be used.

<2-3. Aqueous Medium Used for Slurry>

As the aqueous medium used for the slurry, for example, the one used for polymerization of the copolymer for binders (P) may be used, to which water or a hydrophilic solvent may be further added. Examples of hydrophilic solvents include methanol, ethanol, N-methylpyrrolidone and the like.

<2-4. Properties of Slurry>

In this embodiment, about 1 g of the sample is weighed in an aluminum dish having a diameter of 5 cm, and then it is dried at 130° C. for 1 hour while circulating air in the dryer at atmospheric pressure. The residue is calculated by weighing the dry sample. The nonvolatile content of the slurry is preferably from 30 to 70% by mass, and more preferably from 40 to 60% by mass. The nonvolatile content of the slurry is adjusted by the amount of the aqueous medium (dispersion medium).

In this embodiment, the viscosity of the slurry is measured using a Brookfield type rotational viscometer (for example, TV-25 manufactured by TOKI SANGYO CO., LTD.) at a liquid temperature of 23° C. and a rotation speed of 10 rpm. The viscosity of the slurry is preferably 500 to 20,000 mPa·s, more preferably 5,000 to 20,000 mPa·s. The viscosity of the slurry is adjusted by the amount of the dispersion medium and the thickener. When the nonvolatile content and the viscosity of the slurry are in a suitable range, the coating property to the current collector is good and the productivity of the electrode is excellent. The pH of the slurry is preferably 2 to 10, more preferably 4 to 9, and still more preferably 6 to 9 from the viewpoint of durability of the battery and the like.

<3. Electrode for Nonaqueous Battery>

In the nonaqueous battery electrode of this embodiment, an electrode active material is formed on the surface of a current collector via the copolymer for binders (P). For example, the slurry is coated on a current collector and dried to form an electrode active material layer. Thereafter, the electrode is manufactured by cutting it into an appropriate size.

Examples of the current collector used for the electrode include metals such as iron, copper, aluminum, nickel, and stainless steel, but are not particularly limited. The shape of the current collector is not particularly limited, but a sheet form having a thickness of 0.001 to 0.5 mm is usually used.

As a method of applying the slurry onto the current collector, a general coating method can be used, and is not particularly limited. Examples of the method include a reverse roll method, a direct roll method, a doctor blade method, a knife method, an extrusion method, a curtain method, a gravure method, a bar method, a dipping method, a squeezing method, and the like. Among them, in view of suitability for various physical properties such as viscosity, a drying property of the slurry used for electrodes of nonaqueous batteries, and capability of obtaining a coating film with good surface condition, the doctor blade method, the knife method, or the extrusion method is preferably used.

The slurry may be applied on only one side of the current collector or may be applied on both sides. When the slurry is applied to both surfaces of the current collector, it may be sequentially applied on one side or both sides simultaneously. Further, the slurry may be continuously applied to the surface of the current collector, or may be applied intermittently. The thickness, length and width of the coating film formed by applying the slurry can be appropriately determined depending on the size of the battery or the like.

The method for drying the applied slurry is not particularly limited, but for example, hot air, vacuum, (far) infrared, electron beam, microwave and low temperature wind can be used alone or in combination. A temperature of drying the coating film is usually in the range of 40 to 180° C., and the drying time is usually in the range of 1 to 30 minutes.

The current collector on which the active material layer is formed is cut to an appropriate size and a shape as an electrode. A method of cutting the current collector on which the active material layer is formed is not particularly limited, but for example, a slit, a laser, a wire cut, a cutter, a Thomson, or the like may be used.

The current collector on which the active material layer is formed may be pressed before or after cutting, if necessary. This makes it possible to tightly bond the electrode active material to the electrode and to make the nonaqueous battery compact by thinning the electrode. As a method of pressing, a general method can be used, and in particular, it is preferable to use a die pressing method or a roll pressing method. The pressing pressure is not particularly limited, but it is preferably 0.5 to 5 t/cm$^2$, which is a range that does not affect the doping/dedoping of lithium ions to the electrode active material by pressing.

<4. Nonaqueous Battery>

The nonaqueous battery according to this embodiment is one in which a positive electrode, a negative electrode, an electrolytic solution, and optional components such as a separator are included in an exterior body. One or both of the positive electrode and the negative electrode uses the electrode prepared by the above method. The shape of the electrode may be, for example, a laminate or a wound body, but it is not particularly limited.

<4-1. Electrolyte>

As the electrolytic solution, a nonaqueous solution having ion conductivity is used. Examples of the solution include an organic solvent in which an electrolyte is dissolved, an ionic liquid, and the like.

As the electrolyte, an alkali metal salt can be used, and it can be appropriately selected according to the type of the electrode active material and the like. Examples of the electrolyte include $LiClO_4$, $LiBF_6$, $LiPF_6$, $LiCF_3SO_3$, $LiCF_3CO_2$, $LiAsF_6$, $LiSbF_6$, $LiBloClio$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, lithium aliphatic carboxylate, and the like. Salts using other alkali metals can also be used.

The organic solvent that dissolves the electrolyte is not particularly limited, and examples thereof include carbonate ester compounds such as ethylene carbonate (EC), propylene carbonate (PC), diethyl carbonate (DEC), methylethyl carbonate (MEC), dimethyl carbonate (DMC) and the like; and nitrile compounds such as acetonitrile.

These electrolytes may be used singly or in a combination of two or more.

<4-2. Exterior Body>

As the exterior body, a metal, an aluminum laminate material, or the like can be appropriately used. The shape of the battery may be any shape such as a coin type, a button type, a sheet type, a cylindrical type, a rectangular type, a flat type and the like.

The battery of the present embodiment can be manufactured by using a known manufacturing method.

EXAMPLE

Hereinafter, the present invention will be described in more detail with reference to examples and comparative examples of copolymers for binders (P) (binders), negative electrode slurries, electrodes, and batteries. A composition of a binder, a composition ratio of a slurry and an evaluation result of a sample in each example and comparative example are as shown in Table 1.

The present invention is not limited by these.

Example 1

(Preparation of Copolymer for Binders for Nonaqueous Battery Electrodes (Binder))

N-vinylacetamide (NVA) (manufactured by Showa Denko KK) was used as the monomer (A) represented by the general formula (1). Sodium acrylate (AaNa) (prepared as an aqueous solution having a concentration of 28.5% by mass) was used as the (meth)acrylate salt monomer (B). In addition, V-50 (2,2'-azobis (2-methylpropionamidine) dihydrochloride, Wako Pure Chemical Industries, Ltd.) was used as a polymerization catalyst and ammonium persulfate (manufactured by Wako Pure Chemical Industries, Ltd.) was used as a polymerization initiator.

In a separable flask equipped with a cooling tube, a thermometer, a stirrer and a dropping funnel, 10 parts by mass of NVA, 315.8 parts by mass of a 28.5% by mass aqueous solution of AaNa (90 parts by mass as AaNa), 0.2 parts by weight of V-50, 0.05 parts by weight of ammonium persulfate, and 9.0 parts by mass of water were charged at 30° C. The mixture was heated to 80° C. and polymerization was carried out for 4 hours. Thereafter, the mixture was cooled to room temperature, dried, and pulverized to obtain a powdery copolymer for binders P1 (copolymer P1, Binder P1).

A weight average molecular weight (in terms of pullulan) of the obtained copolymer for binders P1 was measured. The measured weight average molecular weight was 5,500,000.

(Measurement of Weight Average Molecular Weight)

The weight average molecular weight was measured under the following conditions using gel permeation chromatography (GPC).

GPC apparatus: GPC-101 (manufactured by Showa Denko KK))

Solvent: 0.1 M $NaNO_3$ aqueous solution

Sample column: Shodex Column Ohpak SB-806 HQ (8.0 mm I.D.×300 mm Length)×2

Reference column: Shodex Column Ohpak SB-800 RL (8.0 mm I.D.×300 mm Length)×2

Column temperature: 40° C.

Sample concentration: 0.1% by mass

Detector: RI-71S (manufactured by Shimadzu Corporation)

Pump: DU-H 2000 (manufactured by Shimadzu Corporation)

Pressure: 1.3 MPa

Flow rate: 1 ml/min

Molecular weight standards: pullulan (P-5, P-10, P-20, P-50, P-100, P-200, P-400, P-800, P-1300, P-2500 (manufactured by Showa Denko Co., Ltd.))

(Preparation of Negative Electrode Slurry)

Next, 96.5 parts by mass of hardly graphitizable carbon as a negative electrode active material, 3.5 parts by mass of the copolymer P1 for a binder, and 69 parts by mass of water were added, and the mixture was stirred using a stirring mixer (rotation orbital stirring mixer). Stabilization was performed at 2000 rpm for 4 minutes. 16 parts by mass of water was further added, and the mixture was further mixed at 2000 rpm for 4 minutes to prepare a negative electrode slurry.

(Preparation of Negative Electrode)

The negative electrode slurry was applied to one side of a copper foil having a thickness of 10 μm as a current collector using a doctor blade so that the coating amount was 4 $mg/cm^2$ after drying, and dried at 60° C. for 2 minutes and further dried at 100° C. for 10 minutes to form an active material layer. A material made of the active material layer and the current collector was pressed at a pressing pressure of 1 $t/cm^2$ using a mold press to form a negative electrode active material-containing layer. A negative electrode was prepared by cutting the obtained negative electrode active material-containing layer into 22 mm×22 mm and attaching a conductive tab.

(Production of Positive Electrode)

In addition, the positive electrode was prepared in the following manner. 90 parts by mass of $LiNi_{1/3}Mn_{1/3}Co_{1/3}O_2$ as a positive electrode active material, 5 parts by mass of acetylene black as a conductive additive, and 5 parts by mass of polyvinylidene fluoride as a binder were mixed. After 100 parts by mass of N-methyl pyrrolidone was added into the obtained mixture, it was further mixed to prepare a positive electrode slurry.

The prepared positive electrode slurry was applied to a 20 μm thick aluminum foil as a current collector by a doctor blade method so as to have a thickness of 100 μm after roll pressing, and dried at 120° C. for 5 minutes to form a positive electrode active material-containing layer. A positive electrode was prepared by cutting the obtained positive electrode active material-containing layer into 20 mm×20 mm, and attaching a conductive tab.

(Production of Battery)

Using the above-mentioned positive electrode and negative electrode, a lithium ion secondary battery was fabricated as follows.

$LiPF_6$ was added to a mixed solvent prepared by mixing ethylene carbonate (EC) and ethyl methyl carbonate (EMC) at a volume ratio of 40/60 (EC/EMC) to prepare an electrolyte solution used for a lithium ion secondary battery and a concentration was adjusted to 1.0 mol/L.

A separator made of a polyolefin porous film was interposed between the positive electrode and the negative electrode to which the conductive tab was attached so that the active materials of the positive electrode and the negative electrode were opposed to each other in an aluminum laminate exterior body (battery pack). A laminate type battery was obtained by pouring the electrolytic solution into the exterior body and packing it with a vacuum heat sealer.

TABLE 1

| | | Binder | | | | Slurry for negative electrodes | | | | | | |
| | | Composition of the monomer mixture (M) | | | Weight average molecular weight (ten thousand) | Composition of slurry for negative electrodes | | | | Slurry performance | Electrode performance | Battery performance |
| | Binder | N-vinyl-acetamide (% by mass) | Sodium acrylate (% by mass) | Acrylic acid (% by mass) | | Negative electrode active material (parts by mass) | Binder (parts by mass) | Medium | Medium (parts by mass) | Slurry appearance (visually) | Electrode appearance (visually) | Peel strength (mN/mm) | DCR (Ω) |
|---|---|---|---|---|---|---|---|---|---|---|---|---|---|
| Example 1 | Copolymer P1 | 10 | 90 | — | 550 | 96.5 | 3.5 | water | 85 | G | G | 66 | 24 |
| Example 2 | Copolymer P2 | 10 | 75 | 15 | 370 | 96.5 | 3.5 | water | 85 | G | G | 45 | 20 |
| Example 3 | Copolymer P3 | 5 | 95 | — | 850 | 96.5 | 3.5 | water | 85 | G | G | 79 | 23 |
| Example 4 | Copolymer P4 | 2 | 98 | — | 900 | 96.5 | 3.5 | water | 85 | G | G | 64 | 25 |
| Example 5 | Copolymer P5 | 1 | 99 | — | 770 | 96.5 | 3.5 | water | 85 | G | G | 74 | 20 |
| Example 6 | Copolymer P1 | 10 | 90 | — | 550 | 97.0 | 3.0 | water | 85 | G | G | 64 | 22 |
| Example 7 | Copolymer P1 | 10 | 90 | — | 550 | 97.5 | 2.5 | water | 85 | G | G | 45 | 21 |
| Example 8 | Copolymer P1 | 10 | 90 | — | 550 | 98.0 | 2.0 | water | 85 | G | G | 16 | 20 |
| Example 9 | Copolymer P1 | 10 | 90 | — | 550 | 98.5 | 1.5 | water | 85 | G | G | 13 | 19 |
| Comparative Example 1 | Polymer P6 | — | 100 | — | 900 | 96.5 | 3.5 | water | 85 | B | B | 0 | — |
| Comparative Example 2 | Polymer P7 | 100 | | — | 100 | 96.5 | 3.5 | water | 85 | B | B | 0 | — |
| Comparative Example 3 | Copolymer P8 | 80 | 20 | — | 900 | 96.5 | 3.5 | water | 85 | B | B | 80 | 32 |
| Comparative Example 4 | Copolymer P9 | 60 | 40 | — | 870 | 96.5 | 3.5 | water | 85 | B | B | 100 | 34 |
| Comparative Example 5 | SBR/CMC (P10) | — | — | — | — | 96.5 | SBR 2.5/ CMC 1.0 | water | 85 | G | G | 15 | 35 |
| Comparative Example 6 | PVDF (P11) | — | — | — | — | 95.0 | 5.0 | NMP | 85 | G | G | 9 | 33 |

Examples 2-9

Regarding manufacturing conditions of each sample (copolymers for binders for nonaqueous battery electrodes, slurries for negative electrodes, electrodes, or batteries) of Examples 2-9, only parts different from that of Example 1 will be described.

In Example 2, a copolymer for binders P2 (copolymer P2, Binder P2) was synthesized by adding AaNa in the monomer mixture (M) at 75% by mass based on the monomer mixture (M); and then further adding 15% by mass of acrylic acid (Aa) as the ethylenically unsaturated monomer (C). The weight average molecular weight of the copolymer was 3,700,000.

In Example 3, NVA in the monomer mixture (M) was 5% by mass based on the monomer mixture (M) and an amount of AaNa was 95% by mass (copolymer for binders P3 (copolymer P3, Binder P3)). The weight average molecular weight of the copolymer for binders P3 was 8,500,000. In Example 4, NVA in the monomer mixture (M) was 2% by mass based on the monomer mixture (M) and an amount of AaNa was 98% by mass (copolymer for binders P4 (copolymer P4, Binder P4)). The weight average molecular weight of the copolymer P4 was 9,000,000. In Example 5, an amount of NVA in the monomer mixture (M) was 1% by mass and an amount of AaNa was 99% by mass based on total amount of the monomer mixture (M) (a copolymer for binders P5 (copolymer P5, Binder P5)). The copolymer for binders P5 had a weight average molecular weight of 7,700,000.

In Example 6, the composition amount of the negative electrode active material in the negative electrode slurry was 97.0 parts by mass, and the composition amount of the copolymer for binders P1 was 3.0 parts by mass. In Example 7, the composition amount of the negative electrode active material in the negative electrode slurry was 97.5 parts by mass, and the composition amount of the copolymer for binders P1 was 2.5 parts by mass. In Example 8, the composition amount of the negative electrode active material in the negative electrode slurry was 98.0 parts by mass and the composition amount of the copolymer for binders P1 was 2.0 parts by mass. In Example 9, the composition amount of the negative electrode active material in the negative electrode slurry was 98.5 parts by mass and the composition amount of the copolymer P1 was 1.5 parts by mass.

Comparative Examples 1 to 4

Regarding manufacturing conditions of each sample (binders, slurries for negative electrodes, electrodes, or batteries) of Comparative Examples 1 to 4, only parts different from that of Example 1 will be described.

In Comparative Example 1, only NVA was used as a monomer (polymer P6, Binder P6). In Comparative Example 2, only AaNa was used as a monomer (polymer P7, Binder P7). In Comparative Example 3, an amount of NVA in the monomer mixture (M) was 80% by mass based on the monomer mixture (M) and an amount of AaNa was 20% by mass (polymer P8, Binder P8). In Comparative Example 4, an amount of NVA in the monomer mixture (M) was 60% by mass and an amount of AaNa was 40% by mass based on the monomer mixture (M) (polymer P9, Binder P9).

Comparative Example 5

In Comparative Example 5, Binder P10 was obtained by using a dispersion in water of styrene-butadiene latex (SBR) and carboxy methyl cellulose (CMC).

96.5 parts by mass of hardly graphitizable carbon, 1.0 part by mass of carboxymethyl cellulose (trade name: Metolose MAC 350 HC, manufactured by Nippon Paper Chemicals Co., Ltd.) and 49 parts by mass of water, and the mixture was stirred by a stirring mixer (Rotating revolution stirring mixer) at 4,000 rpm for 4 minutes.

Thereafter, 6.25 parts by mass (SBR 2.5 parts by mass, water 3.75 parts by mass) of a water dispersion having SBR 40% by mass and 32 parts by mass of water were added and further mixed for 4 minutes at 2000 rpm to obtain a slurry for a negative electrode.

Using this negative electrode slurry, a negative electrode was produced in the same manner as in Example 1. Further, using this negative electrode and the positive electrode produced by the same method as in Example 1, a battery was fabricated in the same manner as in Example 1.

Comparative Example 6

In Comparative Example 6, using polyvinylidene fluoride (PVDF) as Binder P11.

95 parts by mass of hardly graphitizable carbon as a negative electrode active material, 5.0 parts by mass of Binder P11 and 69 parts by mass of water were added, and the mixture was stirred using a stirring type mixer (rotation/revolution stirring mixer) at 4,000 rpm for 4 minutes. Further, 16 parts by mass of water was added and further mixed at 2000 rpm for 4 minutes to prepare a negative electrode slurry.

Using this negative electrode slurry, a negative electrode was produced in the same manner as in Example 1. Further, using this negative electrode and the positive electrode produced by the same method as in Example 1, a battery was fabricated in the same manner as in Example 1.

Evaluation Method of Examples and Comparative Examples

A negative electrode slurry appearance, electrode performance, and battery performance of Examples and Comparative Examples were evaluated. The evaluation methods were as shown below and the evaluation results are shown in Table 1.

(Slurry Appearance)

Slurry appearances were confirmed visually, and sizes of aggregates and clumps were measured by using a micrometer. When aggregates (1 $mm^3$ to 27 $mm^3$) or lumps (27 $mm^3$ or more) were confirmed, the slurry appearance was judged as "B", and in other cases as "G".

(Electrode Appearance)

Electrode appearances were confirmed visually, and sizes of aggregates and clumps were measured by using a micrometer.

When agglomerates (1 $mm^3$ to 27 $mm^3$) or lumps (27 $mm^3$ or more) were confirmed, or when a streak was observed in the electrode, the electrode appearance was judged as "B", and the other cases as "G".

(Peel Strength of Negative Electrode Active Material Layer)

A negative electrode active material layer, which was formed on a current collector, and an SUS plate were bonded by using two-sided tape (NITTO TAPE No5). A peel strength test was carried out at a peeling width of 25 mm, a peeling rate of 100 mm/min, and a peeling angle of 180°. The obtained value was taken as the peel strength.

(Cell Performance)

The internal resistance of the fabricated battery (DCR ($\Omega$)) was determined as follows.

Charging was performed at a constant current of 0.2 C from a rest potential to 3.6 V, and the state of charge (SOC) was set to 50%. Thereafter, discharging was performed for 60 seconds at current values of 0.2 C, 0.5 C, 1 C, and 2 C. DCR (0) at SOC 50% was determined from the relationship between the four current values (value for 1 second) and voltages.

<Evaluation Results of Examples and Comparative Examples>

As shown in Table 1, in Examples 1 to 9, the electrode (negative electrode) appearance is satisfactory, and the peel strength of the negative electrode active material layer (mN/mm) also shows a sufficient value. In addition, the internal resistance ($\Omega$) when formed into a battery is also sufficiently low.

On the other hand, in Comparative Example 1 using a homopolymer of NVA as a binder and Comparative Example 2 using a homopolymer of AaNa as a binder, the appearance of the slurries was lumpy. In addition, the appearance of the fabricated electrode was streaky, it was impossible to form the electrode active material layer on the electrode surface, and therefore, it was impossible to evaluate the performance as a battery.

In Comparative Examples 3 and 4 containing excess NVA in the monomer mixture (M), the appearance of the slurry was agglomerate. In addition, the appearance of the fabricated electrode was agglomerate, and the internal resistance of a battery could not be sufficiently reduced.

In comparative Example 5 using SBR/CMC as a binder, the internal resistance of a battery could not be sufficiently reduced. In Comparative Example 6 using PVDF as a binder, the peel strength of the electrode active material layer was insufficient, and the internal resistance of a battery could not be sufficiently reduced.

From the above evaluation results, the negative electrode active material layers obtained by applying the slurry containing the binders of the examples and the negative electrode active materials on the current collectors and drying is not problematic in external appearance. In addition, the internal resistance of batteries can be sufficiently reduced while maintaining sufficient peeling strength of the negative electrode active material layers.

Therefore, by using the copolymers of the Examples as binders for nonaqueous battery negative electrodes, it is possible to sufficiently bind the negative electrode active materials in the nonaqueous battery negative electrode and to sufficiently bind the negative electrode active material and the current collector. The internal resistance of a battery can be reduced while maintaining binding properties.

In addition, these binders can also be used as a binder for a positive electrode active material (for nonaqueous battery positive electrodes), and can be used as a binder between positive electrode active materials and between a positive electrode active material and a current collector. The internal resistance of a battery can be reduced, while maintaining binding properties.

The invention claimed is:

1. A copolymer for binders for nonaqueous battery electrodes,
   wherein the copolymer for binders (P) is a copolymer of a monomer mixture (M) that comprises at least a monomer (A) represented by general formula (1) and a (meth)acrylate salt monomer (B);
   an amount of structure derived from the monomer (A) is set to 0.5 to 20.0% by mass based on the copolymer for binders (P), and
   an amount of structure derived from the monomer (B) is 75.0 to 99.0% by mass based on the copolymer for binders (P),

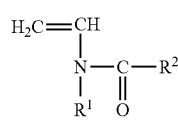
(1)

wherein $R^1$ and $R^2$ each independently represent a hydrogen atom or an alkyl group having 1 to 5 carbon atoms,
wherein the structure derived from the monomer (B) is a structure represented by general formula (2),

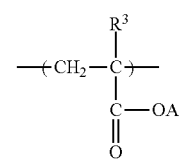
(2)

wherein $R^3$ represents a hydrogen atom or a methyl group, and A represents Na, K or $NH_4$, and
wherein the copolymer is a component of the binders in the nonaqueous battery electrodes.

2. The copolymer for binders for nonaqueous battery electrodes according to claim 1,
   wherein the monomer mixture (M) further comprises an ethylenically unsaturated monomers (C) having a polar functional group, and
   a structure derived from ethylenically unsaturated monomer (C) has a polar functional group.

3. The copolymer for binders for nonaqueous battery electrodes according to claim 1,
   wherein the monomer (A) is N-vinylformamide or N-vinylacetamide.

4. The copolymer for binders for nonaqueous battery electrodes according to claim 1,
   wherein the weight average molecular weight of the copolymer for binders (P) is in the range of 1,000,000 to 10,000,000.

5. The copolymer for binders for nonaqueous battery electrodes according to claim 2,
   wherein an amount of structure derived from the monomer (C) is 0.5 to 15.0% by mass based on the copolymer for binders (P).

6. A slurry for nonaqueous battery electrodes comprising the copolymer for binders for nonaqueous battery electrodes according to claim 1, and an electrode active material.

7. The slurry for nonaqueous battery electrodes according to claim 6,
   wherein the electrode active material is a negative electrode active material.

8. The slurry for nonaqueous battery electrodes according to claim 6,
   wherein an amount of the copolymer for binders for nonaqueous battery electrodes is 0.1 to 5 parts by mass with respect to 100 parts by mass of the electrode active material.

9. A nonaqueous battery electrode comprising
   a current collector, and
   an electrode active material layer formed on the current collector,
   wherein the electrode active material layer comprises the copolymer for binders for nonaqueous battery electrodes according to claim 1.

10. The nonaqueous battery electrode according to claim 9,
    wherein the electrode active material is a negative electrode active material.

11. A nonaqueous battery comprising
    the nonaqueous battery electrode according to claim 9.

* * * * *